United States Patent
Behr et al.

[19]

[11] Patent Number: 6,032,347
[45] Date of Patent: Mar. 7, 2000

[54] TANK AND MANUFACTURING METHOD FOR THE SAME

[75] Inventors: Willibald Behr, Ramsberg; Andreas Hambach, Nuremberg, both of Germany

[73] Assignee: Max Rhodius GmbH, Weissenburg/Bay, Germany

[21] Appl. No.: 09/112,436

[22] Filed: Jul. 9, 1998

[30] Foreign Application Priority Data

Jul. 11, 1997 [DE] Germany ................ 197 29 818

[51] Int. Cl.[7] .................. B23P 17/00; B65D 1/40
[52] U.S. Cl. .............. 29/419.1; 220/734; 220/563
[58] Field of Search ............. 29/527.1; 220/734, 220/562, 563, 86.2, 88.1, 428, 419.1

[56] References Cited

U.S. PATENT DOCUMENTS

| | | |
|---|---|---|
| 2,305,923 | 12/1942 | Held . |
| 3,349,953 | 10/1967 | Conaway et al. . |
| 3,400,854 | 9/1968 | Conaway et al. . |
| 3,650,431 | 3/1972 | Stewart . |
| 3,784,050 | 1/1974 | Pollack . |
| 3,822,807 | 7/1974 | MacDonald et al. . |
| 4,013,190 | 3/1977 | Wiggins et al. . |
| 4,613,054 | 9/1986 | Schrenk . |
| 4,764,408 | 8/1988 | Stedman et al. . |
| 4,844,974 | 7/1989 | McCullough, Jr. et al. . |
| 4,927,045 | 5/1990 | Lichka . |
| 5,031,795 | 7/1991 | Kotera et al. . |
| 5,587,239 | 12/1996 | Ueba et al. . |
| 5,652,066 | 7/1997 | Alhamad . |

FOREIGN PATENT DOCUMENTS

| | | | |
|---|---|---|---|
| 2629397 | 10/1989 | France . | |
| 3905611 | 9/1989 | Germany . | |
| 3-74218 | 3/1991 | Japan .................... | 220/563 |
| 4-352691 | 12/1992 | Japan .................... | 220/734 |
| WO 88/06093 | 8/1988 | WIPO .................... | 220/734 |

*Primary Examiner*—David P. Bryant
*Attorney, Agent, or Firm*—McAulay Nissen Goldberg Kiel & Hand, LLP

[57] ABSTRACT

In a manufacturing method for a tank with an opening and with a device for damping a splashing movement, porous filler bodies which fit through the opening are introduced as a damping device into the tank until the tank is completely filled with them. Accordingly, a tank with an opening and a device for damping a splashing movement is characterized in that the device for damping comprises porous filler bodies which fit through the opening.

7 Claims, 2 Drawing Sheets

TANK AND MANUFACTURING METHOD FOR THE SAME

BACKGROUND OF THE INVENTION a) Field of the Invention

The invention is directed to a method for manufacturing a tank with an opening and with a device for damping a sloshing or splashing movement. The invention is further directed to this tank.

b) Description of the Related Art

When automobiles are accelerated or braked, the fuel normally splashes in the tank. This produces annoying noises in that the fuel that is set in motion strikes against the inner side of the tank and especially also against the upper side of the tank. Such noises are often perceived as annoying and should therefore be minimized.

It is known to fasten acoustic padding comprising an eight-layer knitted fabric inside the tank in the area of the upper side and wall of the tank. In this way, splash-restraining values ranging from good to satisfactory have previously been achieved. A disadvantage in this measure is the complicated mounting of the padding, especially when it must be carried out manually.

Installation generally turns out to be complicated because the padding, whose dimensions typically range from approximately 300 mm to 550 mm, must be introduced into the tank at the upper side through an opening in the tank which usually has a diameter of only 120 mm at most and must be secured at fastening bolts which are arranged specifically for this purpose. A further work step consists in providing the acoustic padding with extra holes for this purpose. On the whole, it is very complicated to provide a device of this kind for damping splashing noises.

Further, it is disadvantageous that, in this type of installation, splashing noises generally depend on the fill level because the noises originate in different areas of the tank, but the tank cannot be completely lined using this method. A complete lining of these areas is impossible because of the quantity of fastening bolts which would be needed for this purpose and which would compromise the strength of the tank. Therefore, splashing noises are still produced at certain fill levels. Subsequent installation steps in the form of blades or other kinds of flow interrupters achieve only unsatisfactory results because of the, at present, commonly used methods of manufacturing tanks as blown polyethylene tanks.

However, splashing does not only result in unwanted noises; in the case of highly explosive materials such as nitroglycerin, a splashing movement can also cause self-ignition. Thus, splashing movement should also be damped as far as possible in tanks used for transporting such materials.

OBJECT AND SUMMARY OF THE INVENTION

It is the primary object of the invention to eliminate splashing movement through effective insulation of a tank, wherein this insulation can be arranged economically in a finished tank or in a blown fuel tank which is manufactured in one piece.

This object is met in a manufacturing method in that porous filler bodies which fit through the opening are introduced as a damping device into the tank until the tank is completely filled with them. Any opening is suitable for this purpose. However, the largest opening is preferably used for this purpose in order to enable the insertion of the largest possible filler bodies, because larger filler bodies take up less of the space for receiving the intended contents of the tank. The largest opening is generally that through which tank inserts such as the fuel level indicator, etc. are introduced. It generally has a diameter of 10 to 20 cm.

According to the invention, instead of suspending large knitted mats, much smaller porous filler bodies are introduced into the tank opening. Further, fastening bolts had also to be arranged in the tank in the prior art. This step is omitted according to the invention because the filler bodies are fixed due to the fact that the tank is completely filled with them. Because of the complete filling of the tank, the filler bodies contact the wall of the tank and there is only a small intervening space between the filler bodies and the tank wall in which a splashing of the fuel is still sharply reduced. The movement of the filler bodies themselves is also prevented in this way, so that they also can not cause any new noise by their own movement and impact against the wall. Further, because of their porosity, it is ensured, given a suitable size of the pores, that the material of the filler bodies occupies little space so that the volume available for filling with fuel is only slightly restricted.

Therefore, a tank according to the invention is characterized in that the damping device comprises porous hollow bodies which fit through the tank opening.

Tests in tanks of the type mentioned above have shown that splashing noises are no longer discernible during usual accelerations and decelerations regardless of the fill level.

As has already been made clear, the material of the filler body should take up only a small proportion of the contents. On the other hand, the pore size should be small enough so that as few splashing movements as possible occur in the pores themselves. In this respect, and also in order to provide a simple method of manufacture, it has proven especially beneficial in an advantageous further development that the filler bodies are formed of knitted or woven fabric or that the filler bodies are made of knitted or woven packing. In practical tests, a maximum displacement of only 2 liters was achieved in a tank with a volume of 60 liters due to the knitted material. In this embodiment example, no noise was noticeable any longer. Further, filler bodies of this kind are very elastic so that movements of the filler bodies themselves also only generate little new noise.

In particular, it is very advantageous when the filler bodies have a certain stability so that they can not deform over the course of time and no new space in which splashing movements are not damped can occur after a period of time. According to a further development of the invention, it has proven particularly advantageous that the filler bodies are formed and manufactured from knitted fabric which is corrugated or which is structured in some other manner. A particularly preferred form consists in that a tube is knitted from a plastic fiber and folded together, and a portion of the knit is necked or constricted by pulling out a middle stitch row to form the filler body. Such shapes which are formed when a thread is pulled out of a tubular knitted fabric are also known as roses.

In this respect, the use of a rose, formed from a folded knitted tube from which a center stitch row has been pulled out, as a filler body for a tank makes up part of the invention.

This rose has a particularly high dimensional stability or shape retention which, as has already been shown, is especially advantageous for the arrangement of the invention. The dimensional stability is especially high when the pulled out center stitch is severed and its two open ends are fixed, in particular by heat-sealing.

In another advantageous further development of the invention which also ensures dimensional stability above all, these roses or other filler bodies are subjected to prior thermal treatment before introducing into the tank. In subsequent processing steps or even during its use in a motor vehicle, the tank can sometimes become very warm which in the case of plastic bodies, for example, could lead to a thermal shrinking process which would, in turn, free up some of the volume in which splashing noises could occur. However, such shrinkage is prevented by means of the prior thermal treatment in accordance with the further development. The filler bodies are then dimensionally stable, given suitable parameters for the prior thermal treatment.

There is also usually a fill level indicator in the tank of a motor vehicle. There are different types of fill level indicator. In the case of open-type fill level indicators, the filler bodies could impede the fill level indicator and impair its function. Therefore, in accordance with an advantageous further development of the invention, a fill level indicator located in the tank is enclosed prior to installation of the filler bodies. In this respect, in particular, a fill level indicator is so enclosed in the tank that the fill level indicator is separated from filler bodies.

In order to prevent a splashing movement, the material for the filler bodies can be a metal such as steel, copper or aluminum or can also be plastic.

However, it has been shown in particular that when the filler bodies, in accordance with a preferred further development, are formed of a fuel-resistant plastic, especially polyethylene, advantages are provided because of its high elasticity among other reasons.

Polyethylene is resistant to fuel and can be knitted easily. Further, materials of this kind are elastic, so that no noise will be produced if the filler bodies strike the inner wall of the tank.

Further advantages and particulars of the invention are given in the following description of embodiment examples with reference to the drawing.

DESCRIPTION OF THE PREFERRED EMBODIMENTS

Figure 1:
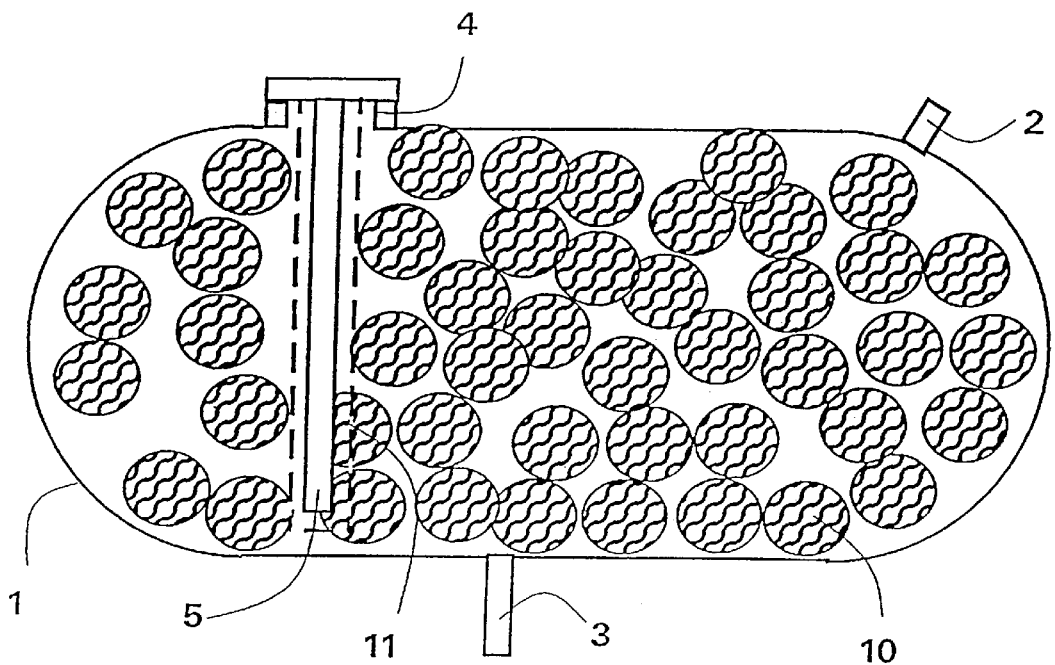
FIG. 1 is a schematic view of a first embodiment example of a tank.

FIG. 1 shows schematically a tank 1 which has a fill neck 2 and a fuel outlet 3. Further, an opening 4 is provided through which inserts are usually introduced into the tank 1. Shown schematically, in particular, is a fill level indicator 5 which is introduced into the tank 1 through the opening 4.

In order to prevent splashing noises, the tank 1 is completely filled with filler bodies 10, namely by blowing them in through the opening 4 that offers the largest opening in the tank 1. The largest opening 4 should be selected for filling so that filler bodies 10 having the greatest possible volume can be used because the largest possible intermediate spaces are formed by them and the smallest possible tank volume is used up by the filler bodies 10. The largest opening of the tank 1 is opening 4 which can have a diameter of between 10 and 20 cm. With this large diameter, filler bodies 10 having a maximum extension of greater than 5 cm, preferably even greater than 10 cm, can also be introduced into the tank 1.

The fill lever indicator 5 is enclosed prior to installation by a sieve-like enclosure 11 so that the operation of the fill level indicator 5 is not impaired by the filler bodies 10.

The filler bodies 10 should preferably be made from elastic material so that any movement of these filler bodies 10 in the direction of the wall of the tank will not initiate additional noise. Further, the filler bodies should be resistant to fuel. In the embodiment example, the filler bodies 10 were made from polyethylene fibers with a diameter of approximately ½ mm. Knitted or woven fabrics were prepared for production.

Figure 2:
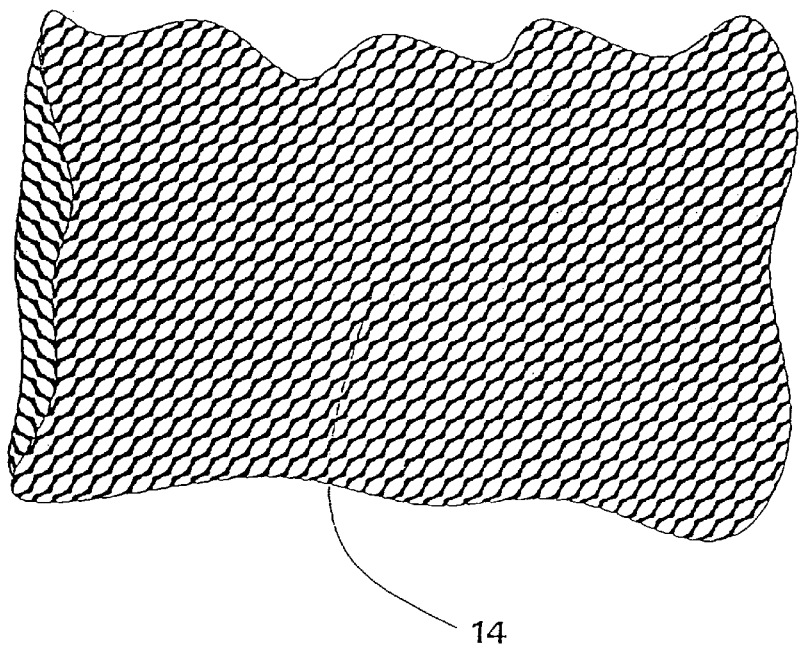
FIG. 2 shows a knitted tube which can serve as a starting product for a filler body.

FIG. 2 is a schematic view of a tubular-knitted tube 12 such as that used as an intermediate product for the manufacture of filler bodies 10 for the tank 1 in FIG. 1. These knitted fabrics 12 had a length of 160 mm and a width of 180 mm, wherein the weight was roughly 7 g.

Figure 3:
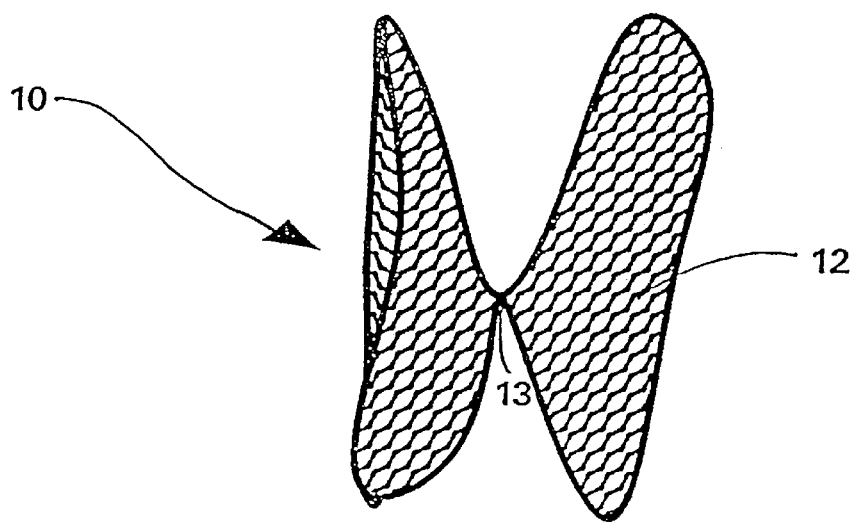
FIG. 3 is a schematic view of a first embodiment example for a filler body.

The filler body was suitably reduced in size by necking in the middle, so that it fits through an opening 4 with a diameter of 120 mm. An embodiment example of this kind is shown in FIG. 3. The constriction or necking is carried out in this example at point 13 by an additional thread that is wound around and heat-sealed.

Figure 4:
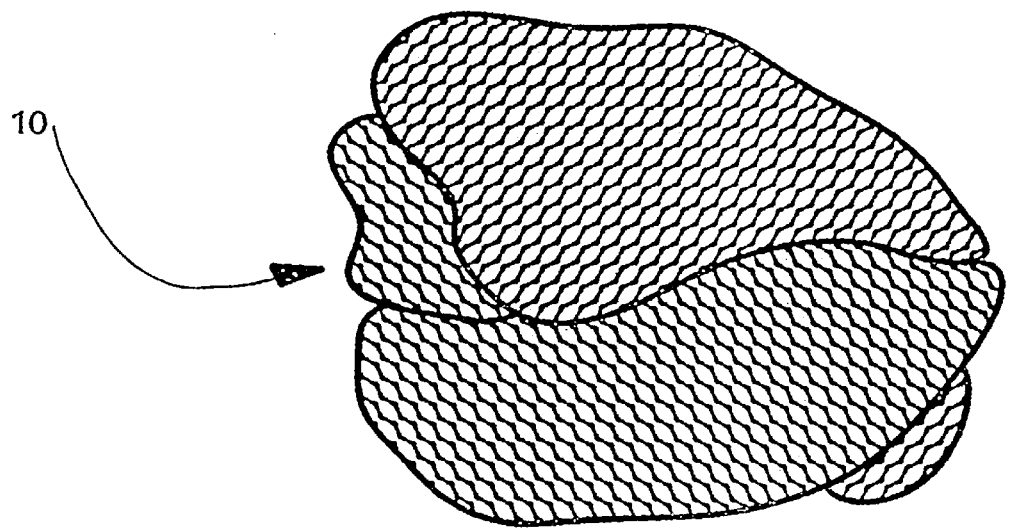
FIG. 4 shows a filler body in the shape of a rose.

The embodiment example of a filler body 10 according to FIG. 4 in which a thread was pulled out at point 14, according to FIG. 2, so that the knitted tube 12 was completely constricted has proven particularly stable with respect to shape retention. The pulled out thread was then severed and heat-sealed, resulting in the approximate shape shown in FIG. 4.

A structure of the kind mentioned above is also referred to as a rose. By using roses of this kind as filler bodies 10, the volume taken up by the volume of the polyethylene fiber of the filler body 10 was advantageously particularly low. At a volume of 60 l to be filled and a packing volume of 30 kg per m$^3$, the polyethylene material contained in the fibers occupied a total of only 2 l. Tests showed results ranging from good to very good damping at all fill levels because the tank contents are inert due to the filler bodies 10 during abrupt movements and the mass cannot strike against smooth surfaces, so that the slapping of the fuel against the wall and upper surface of the tank, which is substantially responsible for the noise, is prevented. But the movement itself is also extensively damped. Wave motion in liquids result from circular movements of infinitesimal liquid particles. Therefore, small pore sizes also damp large surface waves, which leads to increased inertia of the liquid found in the tank.

Further, the invention enables an economical filling of the tank in which filler bodies of the type mentioned above can be blown in through the opening 4. This mode of manufacture is therefore suitable particularly for automated and rapid filling. In the case of fuel tanks, it must be ensured under all circumstances that the functioning of the fill level system is not impaired during filling. For this reason, the fill level indicator 5 is enclosed by a cage 11.

In addition to the advantages mentioned above, an unexpected effect was also demonstrated. Because of the increased inertia of the tank contents, the fill level is also indicated in a substantially smoother and more accurate manner.

While the foregoing description and drawings represent the preferred embodiments of the present invention, it will be obvious to those skilled in the art that various changes and modifications may be made therein without departing from the true spirit and scope of the present invention.

What is claimed is:

1. In a method for manufacturing a tank including a device for damping a splashing movement therein and an opening providing access to the interior of the tank, the improvement comprising:

providing a plurality of porous filler bodies, each of said filler bodies being formed by forming a corrugated tube from knitted fabric, said fabric including plastic fibers; collapsing the tube onto itself to form a folded tubular configuration; and pulling out a middle stitch thread from the folded tubular configuration to constrict a central portion thereof; and introducing the porous filler bodies through the opening in the tank until the tank is completely filled with porous filler bodies.

2. The manufacturing method according to claim 1, further comprising severing the pulled out middle stitch thread and heat-sealing its severed ends.

3. The manufacturing method according to claim 1, further comprising subjecting the porous filler bodies to thermal treatment before inserting the filler bodies into the tank.

4. The manufacturing method according to claim 1, wherein the tank includes a fill level indicator therein, the method further comprising enclosing the fill level indicator prior to introduction of the filler bodies into the tank.

5. In a method for manufacturing a tank having an opening therein and a device for damping a splashing movement within the tank, the improvement comprising:

filling the tank with porous filler bodies through the opening in the tank, each filler body comprising a rose formed from a folded knitted tube from which a center stitch has been pulled out to constrict the filler body in a central portion thereof.

6. The method according to claim 5, wherein the knitted tube is knitted from plastic fibers.

7. The method according to claim 6, wherein the plastic fibers are polyethylene fibers.

* * * * *